(12) United States Patent
Kinebuchi et al.

(10) Patent No.: US 9,874,804 B2
(45) Date of Patent: Jan. 23, 2018

(54) PROJECTOR WITH ADJUSTABLE SUPPORT

(71) Applicant: SEIKO EPSON CORPORATION, Tokyo (JP)

(72) Inventors: Tadashi Kinebuchi, Okaya (JP); Kaoru Yamaguchi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/182,064

(22) Filed: Jun. 14, 2016

(65) Prior Publication Data

US 2016/0291448 A1 Oct. 6, 2016

Related U.S. Application Data

(63) Continuation of application No. 14/330,222, filed on Jul. 14, 2014, now Pat. No. 9,405,176.

(30) Foreign Application Priority Data

Jul. 19, 2013 (JP) .................................. 2013-150129
Jul. 19, 2013 (JP) .................................. 2013-150130

(51) Int. Cl.
*G03B 21/14* (2006.01)
*G03B 21/16* (2006.01)
*F16M 11/00* (2006.01)
*H04N 9/31* (2006.01)
*F16M 11/10* (2006.01)
(Continued)

(52) U.S. Cl.
CPC ............ *G03B 21/145* (2013.01); *F16M 11/00* (2013.01); *F16M 11/10* (2013.01); *F16M 11/18* (2013.01); *F16M 11/2014* (2013.01); *F16M 11/2085* (2013.01); *F16M 11/2092* (2013.01); *G03B 21/16* (2013.01); *H04N 9/31* (2013.01);
(Continued)

(58) Field of Classification Search
CPC ........ G03B 21/14; G03B 21/16; G03B 21/145; F21V 29/02; F21V 29/677; H04N 9/3141
See application file for complete search history.

(56) References Cited

U.S. PATENT DOCUMENTS 5,806,950 A 9/1998 Gale et al.
6,394,609 B1 5/2002 Rodriguez, Jr. et al.
(Continued)

FOREIGN PATENT DOCUMENTS

JP H02-016516 U 2/1990
JP H08-180975 A 7/1996
(Continued)

OTHER PUBLICATIONS

Dec. 17, 2015 Office Action issued in U.S. Appl. No. 14/330,222.
Mar. 31, 2016 Notice of Allowance issued in U.S. Appl. No. 14/330,222.

*Primary Examiner* — Sultan Chowdhury
(74) *Attorney, Agent, or Firm* — Oliff PLC

(57) ABSTRACT

A projector includes a power source accommodation section and a projection section body. The power source accommodation section is supported by a duct and accommodates a power source circuit that converts electric power supplied from the duct. The projection section body accommodates a projection section that projects an image, and the projection section body is so supported by the power source accommodation section that a direction in which the image is projected is adjustable.

7 Claims, 7 Drawing Sheets

(51) Int. Cl.
*F16M 11/18* (2006.01)
*F16M 11/20* (2006.01)
*G03B 21/20* (2006.01)
*G03B 33/06* (2006.01)

(52) U.S. Cl.
CPC ......... *H04N 9/3144* (2013.01); *G03B 21/208* (2013.01); *G03B 21/2033* (2013.01); *G03B 33/06* (2013.01)

(56) References Cited

U.S. PATENT DOCUMENTS

| | | | |
|---|---|---|---|
| 6,633,346 | B1 | 10/2003 | Yamamoto |
| 6,830,344 | B2 | 12/2004 | Reho et al. |
| 8,344,655 | B2 | 1/2013 | Luk et al. |
| 2001/0017687 | A1 | 8/2001 | Rodriguez et al. |
| 2001/0046035 | A1 | 11/2001 | Vanderwerf et al. |
| 2001/0052965 | A1 | 12/2001 | Rodriguez |
| 2002/0005915 | A1 | 1/2002 | Rodriguez |
| 2002/0021417 | A1 | 2/2002 | Rodriguez et al. |
| 2003/0123032 | A1 | 7/2003 | Rodriguez |
| 2005/0030494 | A1* | 2/2005 | Kumai ............ A47B 37/02 353/119 |
| 2005/0105055 | A1* | 5/2005 | Olson ............ G03B 21/14 353/30 |
| 2005/0140941 | A1 | 6/2005 | Maddock |
| 2009/0213332 | A1* | 8/2009 | Fujinawa ............ H04N 9/3141 353/15 |
| 2012/0008110 | A1* | 1/2012 | Chen ............ G03B 21/145 353/119 |
| 2012/0214323 | A1* | 8/2012 | Gore ............ H04N 9/3173 439/212 |

FOREIGN PATENT DOCUMENTS

| | | | |
|---|---|---|---|
| JP | 3079293 | U | 8/2001 |
| JP | 2002-538508 | A | 11/2002 |
| JP | 2002344846 | A | 11/2002 |
| JP | 2004-037918 | A | 2/2004 |
| JP | 2004-126381 | A | 4/2004 |
| JP | 2004-184768 | A | 7/2004 |
| JP | 2004-336615 | A | 11/2004 |
| JP | 2005-099588 | A | 4/2005 |
| JP | 2006-084765 | A | 3/2006 |
| JP | 2008-176338 | A | 7/2008 |
| JP | 2008-191437 | A | 8/2008 |
| JP | 2009245616 | A | 10/2009 |
| JP | 2009245617 | A | 10/2009 |
| JP | 2009277364 | A | 11/2009 |
| JP | 2010-251030 | A | 11/2010 |
| JP | 2013-037973 | A | 2/2013 |
| JP | 2013-076734 | A | 4/2013 |
| JP | 2013-080139 | A | 5/2013 |

\* cited by examiner

PROJECTOR WITH ADJUSTABLE SUPPORT

This application is a Continuation of U.S. patent application Ser. No. 14/330,222, filed Jul. 14, 2014, which claims the priority of Japanese Patent Application Nos. 2013-150129, filed Jul. 19, 2013, and 2013-150130, filed Jul. 19, 2013. All of the above applications are expressly incorporated herein by reference.

BACKGROUND

1. Technical Field

The present invention relates to a projector that projects an image.

2. Related Art

In related art, a projector that projects an image is fixed to a ceiling, a wall surface, or any other surface of a room in some cases, and there is a proposed apparatus for hanging and installing such a projector (see JP-A-2002-344846 and U.S. Pat. No. 8,344,655, for example). In the configuration described in JP-A-2002-344846, a top plate of a projector is securely fixed to a ceiling with bolts. U.S. Pat. No. 8,344,655 describes that a DLP (digital light processor) is supported by a track of a track lighting system to which a plurality of lighting apparatus can be attached and the DLP is controlled via the track.

To fix a projector to a ceiling or any other surface, it is necessary not only to, of course, prevent the projector from falling but also to fix the projector securely enough to prevent inclination and shift of a projected image during use of the projector. As a result, the position and projection direction of the projector can be changed only in a limited sense, and the changes are not readily made. For example, the apparatus described in JP-A-2002-344846 uses a bolt/nut-based mechanism that allows adjustment of the angle at which the projector is attached, but the range over which the attachment angle is adjusted is small, and the position where the projector is attached cannot be changed.

SUMMARY

An objective of the invention is to provide a projector that arrows the image projection direction to be readily changed after the projector is set relative to a ceiling surface or any other surface. Another objective of the invention is to provide a projector that arrows at least one of the projected image inclination and position to be readily adjusted after the projector is set relative to a ceiling surface or any other surface.

An aspect of the invention relates to a projector including a power source accommodation section capable of being supported by a power supply and accommodates a power source section that converts electric power supplied from the power supply and a projection section body that accommodates a projection section that projects an image, the projection section body so supported by the power source accommodation section that a direction in which the image is projected is adjustable.

According to the configuration described above, the power source accommodation section supported by the power supply accommodates the power source section, and the projection section body supported by the power source accommodation section accommodates the projection section. To change the projection direction in this configuration, the projection section body, which is lightweight because the power source section is not accommodated therein but is separated therefrom, only needs to be moved. Further, the power source accommodation section, which accommodated the power source section and is therefore a heavy component, does not need to be moved when the projection direction is changed. As a result, the burden on a mechanism that supports the projection section body is reduced and hence load capacity requirements are lowered, whereby a structure that allows the angle of the projection section to be changed over a wide range and has other advantages can be employed. Further, since the power source accommodation section is supported by the power supply, no cable or any other component that allows the power supply to provide the power source accommodation section with electric power needs to be separately provided, whereby the structure can be simplified and the power source accommodation section can be securely held. Therefore, the projector provided in the aspect of the invention can be securely attached to a ceiling surface or any other surface and allows the image projection direction to be readily adjusted over a wide range.

In the projector described above, the power source accommodation section may have an enclosure having a longitudinally elongated shape and a connector section that extends upward from the enclosure and is capable of being connected to the power supply having a watershoot-like shape, and the connector section may be capable of being fixed to the power supply with the enclosure extending in the longitudinal direction of the power supply.

According to the configuration described above, the power source accommodation section can be attached to the watershoot-shaped power supply, such as what is called a lighting apparatus duct and a power source duct, whereby the position where the projector is attached can be readily changed in the longitudinal direction of the power supply. Further, since the enclosure of the power source accommodation section extends in the longitudinal direction of the power supply, the projector can be so attached that it does not greatly attract attention.

The projector described above may further include a support section that is coupled to the power source accommodation section and the projection section body and allows the power source accommodation section to support the projection section body, and the support section may be connected to the power source accommodation section in a position directly below the connector section.

According to the configuration described above, the support section is coupled to the power source accommodation section in a position directly below the connector section, which connects the enclosure of the power source accommodation section to the power supply. As a result, since the load applied to the connector section is substantially limited to a load in the vertical direction, the burden on the connector section can be reduced, whereby the structure of the connector section can be simplified and the position where the projector is attached can be readily changed.

The projector described above may further include a support section that is coupled to the power source accommodation section and the projection section body and allows the power source accommodation section to support the projection section body, and the support section may be so coupled to the power source accommodation section and the projection section body that the support section is capable of conducting heat from at least one of the power source accommodation section and the projection section body.

According to the configuration described above, heat generated in the power source accommodation section and the projection section body can be conducted to the support section and dissipated therethrough, whereby heat dissipation performance of the projector can be enhanced. The projector is therefore allowed to operate in a stable manner, and a compact cooling fan or no cooling fan can be used.

In the projector described above, the projection section may include a light source.

According to the configuration described above, since a light source is accommodated in the projection section, the configuration that couples the power source accommodation section and the projection section body to each other can be simplified, whereby the range over which the projection section body is movable can be increased and other advantages are provided.

In the projector described above, the power source accommodation section may accommodate a light source and include a light guide section that guides light emitted from the light source to the projection section body.

According to the configuration described above, in which the power source accommodation section includes a light source, the weight of the projection section body can further be reduced. As a result, the burden on the mechanism that supports the projection section body can be further reduced and hence the mechanism can be designed with an increased degree of freedom, whereby a structure that allows the angle of the projection section can be changed over a wide range and has other advantages can be employed.

The projector described above may further include a support mechanism capable of changing at least one of the direction and position of the projection section body with respect to the power supply.

According to the configuration described above, since at least one of the direction and position of the projection section can be changed with respect to the power supply, the adjustment of the direction and position of the projection section body can be made with the projector fixed to the power supply. As a result, the projector provided in accordance with the aspect can be securely attached to a ceiling surface or any other surface and allows the image projection direction to be readily adjusted over a wide range.

In the projector described above, the power source accommodation section may have an enclosure and a connector section capable of being fixed to the power supply, and the support mechanism may be capable of changing at least one of the direction and position of the enclosure with respect to the connector section.

According to the configuration described above, at least one of the direction and position of the enclosure of the power source accommodation section can be changed with the connector section fixed to the power supply. As a result, the image projection direction can be readily adjusted by changing the direction and position of the enclosure with the power source accommodation section attached to the power supply.

In the projector described above, the power source accommodation section may be capable of being mounted on the power supply installed along an installation surface, and the support mechanism may be capable of adjusting inclination of the projection section body in a direction in which inclination of the installation surface is compensated.

According to the configuration described above, when a ceiling surface, a wall surface, or any other surface is inclined, inclination of the projection section body is so adjusted that the inclination of the surface is compensated, whereby the resultant inclination of a projected image can be readily corrected.

The projector described above may further include an angle adjustment mechanism capable of adjusting the angle of the projection section body with respect to the power supply in addition to the support mechanism. The angle adjustment mechanism may allow the projection section body to pivot around at least one axis, and the support mechanism may allow the projection section body to pivot around an axis that is not parallel to the pivotal axis of the angle adjustment mechanism.

According to the configuration described above, not only can the support mechanism adjust the direction and position of the projection section body, but also the angle adjustment mechanism allows the projection section body to pivot around an axis oriented in a different direction. As a result, the direction in which an image is projected can be freely adjusted.

Another aspect of the invention relates to a projector including a mounter section capable of being mounted on a power supply, a projection section body having a projection section that projects an image, the projection section body supported by the mounter section, and a support mechanism capable of changing at least one of the direction and position of the projection section body with respect to the power supply.

According to the configuration described above, since at least one of the direction and position of the projection section can be adjusted with respect to the mounter section supported by the power supply, the direction and position of the projection section body can be adjusted with the mounter section fixed to the power supply. Therefore, the projector provided in the aspect of the invention can be securely attached to a ceiling surface or any other surface and allows the image projection direction to be readily adjusted over a wide range.

Still another aspect of the invention relates to a projector including a first enclosure, a first mechanism, a connector section that is movably coupled to the first enclosure via the first mechanism and is capable of being connected to a power supply, a second mechanism, and a second enclosure that is movably coupled to the first enclosure via the second mechanism and positioned on the opposite side of the first enclosure to the connector section. The second enclosure includes a projection section. The first mechanism is capable of adjusting the orientation of the connector section with respect to the first enclosure around an imaginary first axis. The second mechanism is capable of adjusting the orientation of the second enclosure with respect to the first enclosure around a second axis substantially perpendicular to the first axis and around a third axis substantially perpendicular to the second axis.

According to the configuration described above, since the orientation of the second enclosure can be adjusted around the two axes with the connector section connected to the power supply, and the orientation of the connector section can be adjusted around the first axis, the direction in which the projector projects an image can be adjusted with an increased degree of freedom. Therefore, for example, even when a ceiling on which the power supply is provided is not parallel to the horizontal plane, the upper and lower edges of an image projected by the projector can be readily so adjusted that the edges are parallel to the horizontal plane.

According to the aspects of the invention, a projector that can be securely attached to a ceiling surface or any other surface and allows the image projection direction to be readily adjusted can be provided.

BRIEF DESCRIPTION OF THE DRAWINGS

The invention will be described with reference to the accompanying drawings, wherein like numbers reference like elements.

FIG. 2A is a front view, and FIG. 2B is a side view.

FIG. 6A is a front view, and FIG. 6B is a side view.

FIG. 7A is a front view, FIG. 7B is a side view, and FIG. 7C is a plan view.

DESCRIPTION OF EXEMPLARY EMBODIMENTS

First Embodiment

Figure 1:
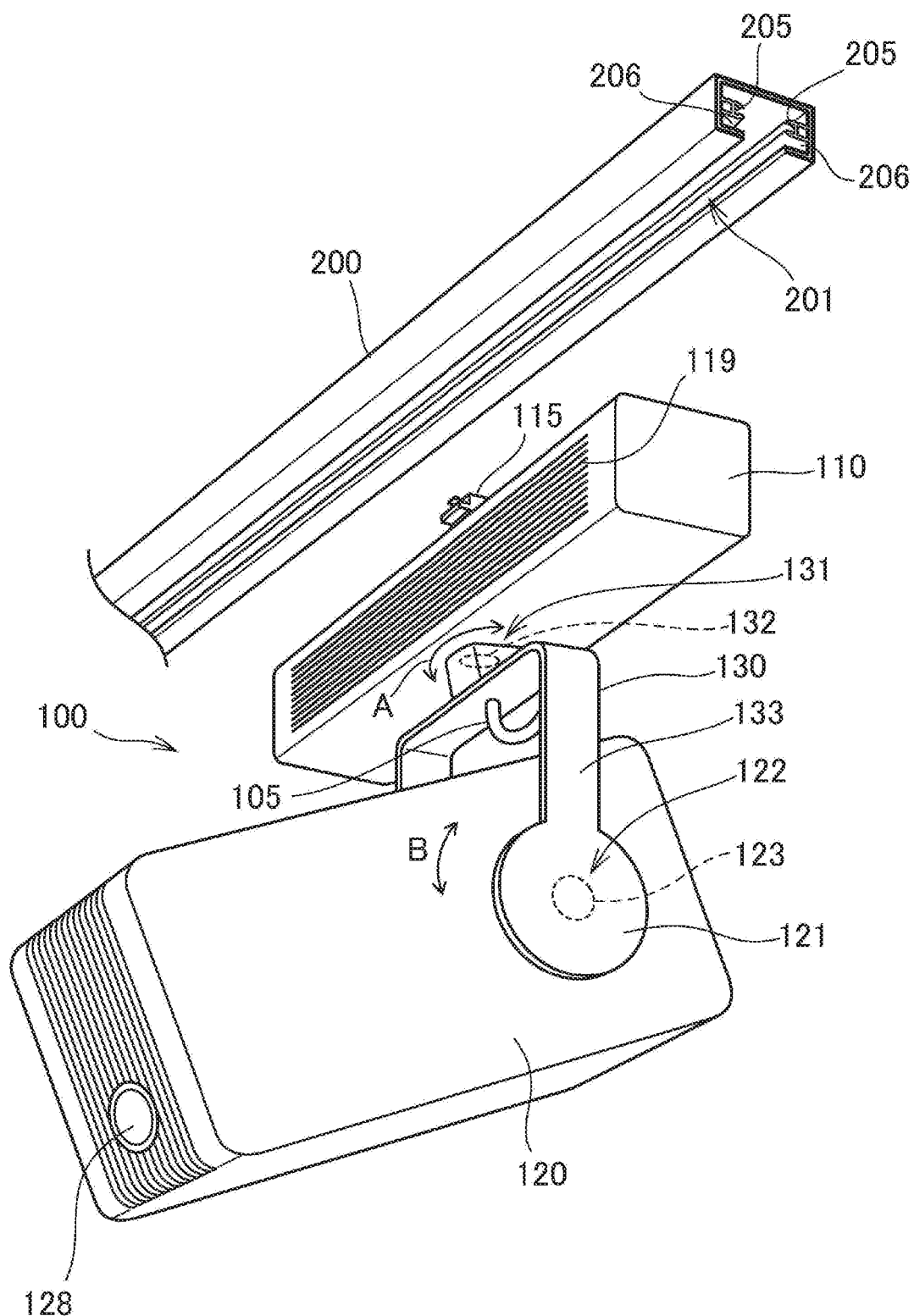
FIG. 1 is a perspective view of a projector according to a first embodiment.
Figure 2A:
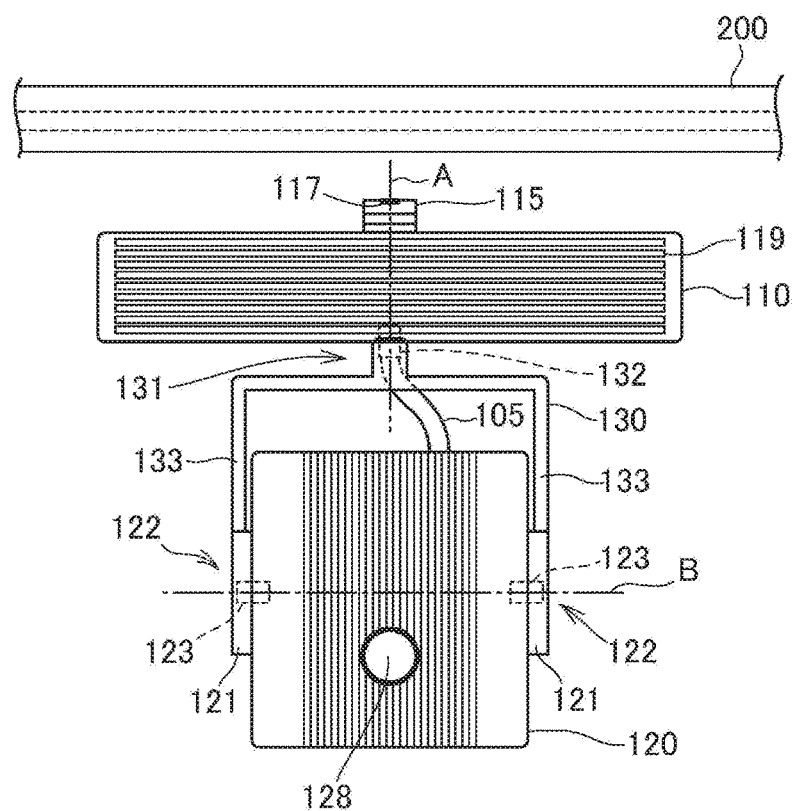
FIGS. 2A and 2B show the configuration of the projector according to the first embodiment.
Figure 2B:
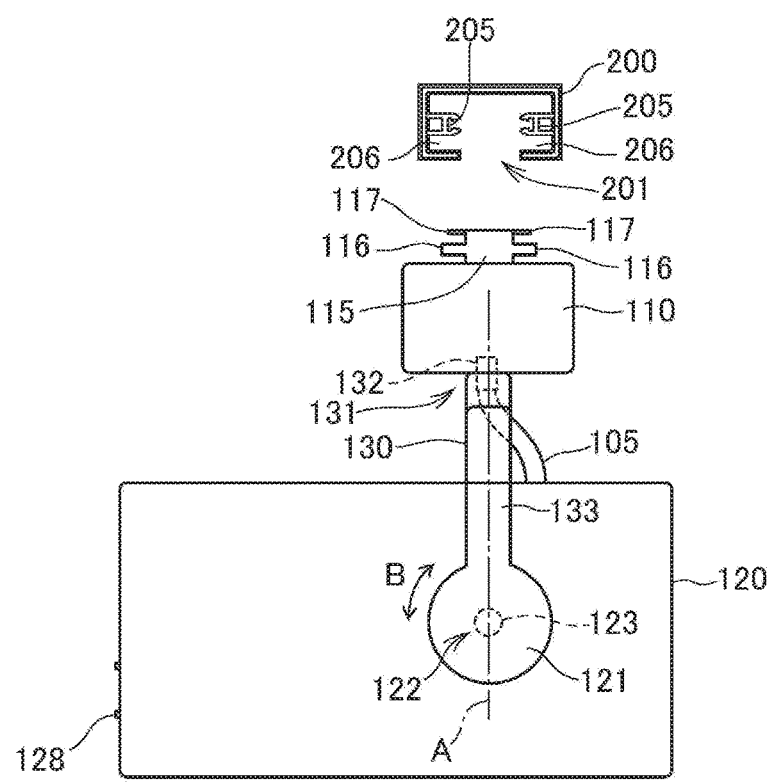

FIGS. 1, 2A, and 2B show the configuration of a projector 100 according to a first embodiment to which the invention is applied. FIG. 1 is a perspective view. FIG. 2A is a front view, and FIG. 2B is a side view. FIGS. 1, 2A, and 2B also show a duct 200, to which the projector 100 is attached.

The projector 100 has a light source built therein, modulates light emitted from the light source to form image light, and projects an image on a wall surface or a screen, as will be described later.

The projector 100 includes a power source accommodation section 110, a projection section body 120, which is separate from the power source accommodation section 110, and a support member 130 (support section), which couples the power source accommodation section 110 and the projection section body 120 to each other. The power source accommodation section 110 has an elongated, substantially box-shaped enclosure, which accommodates a power source circuit 24 (FIG. 4), which will be described later. On the other hand, the projection section body 120 has a substantially box-shaped enclosure, which accommodates a projection section 125 (FIG. 3), which will be described later.

The support member 130 is coupled to the bottom surface of the power source accommodation section 110 via a coupler section 131. The coupler section 131 supports the support member 130 in such a way that the coupler section 131 couples the upper end of the support member 130 to the bottom surface of the power source accommodation section 110 and the support member 130 is pivotal around a pivotal shaft 132. In FIGS. 1, 2A, and 2B, the arrow A indicates the direction in which the coupler section 131 pivots, and the dashed line A indicates an axial line corresponding to the center of the pivotal motion. Further, the coupler section 131 can fix the support member 130 to the power source accommodation section 110 at an arbitrary position in the pivotal direction. The coupler section 131 therefore allows the support member 130 to pivot relative to the power source accommodation section 110 to a point where the projection section body 120 is oriented in an arbitrary direction and the support member 130 to be fixed to the power source accommodation section 110.

The coupler section 131 can be formed, for example, of a panel that forms the enclosure of the power source accommodation section 110 or a frame in the power source accommodation section 110, the pivotal shaft 132, and a bolt and a nut that can be so fastened that they restrict the pivotal motion around the pivotal shaft 132. The coupler section 131 may instead be formed of a bearing, a pin that stops pivotal motion produced by the bearing, and a slide mechanism that allows the pin to slide. The coupler section 131 may still instead be formed of a combination of a ring-shaped slide member and a bolt and a nut without the pivotal shaft 132 having a rod-like shape.

A lower portion of the support member 130 bifurcates into two arm portions 133, 133, which extend downward. Lower end portions of the arm portions 133, 133 form flat plate portions 121, 121. The flat plate portions 121, 121 are in contact with the opposite side surfaces of the projection section body 120 and coupled to the projection section body 120 via coupler sections 122, 122. The coupler sections 122, 122 support the projection section body 120 in such a way that the coupler sections 122, 122 couple the flat plate portions 121, 121 to the side surfaces of the projection section body 120 and the flat plate portions 121, 121 are pivotal around pivotal shafts 123. In FIGS. 1, 2A, and 2B, the arrow B indicates the direction in which the coupler sections 122, 122 pivot, and the dashed line B indicates an axial line corresponding to the center of the pivotal motion. Further, the coupler sections 122, 122 can fix the projection section body 120 to the flat plate portions 121, 121 at an arbitrary position in the pivotal direction. The coupler sections 122, 122 therefore allow the projection section body 120 to pivot relative to the support member 130 to a point where the projection section body 120 is oriented in an arbitrary direction and the projection section body 120 to be fixed to the support member 130.

The coupler sections 122, 122 can be formed, for example, of a panel that forms the enclosure of the projection section body 120 or a frame in the projection section body 120, the pivotal shafts 123, and a bolt and a nut that can be so fastened that they restrict the pivotal motion around the pivotal shafts 123. The coupler sections 122, 122 may instead be formed of a bearing, a pin that stops pivotal motion produced by the bearing, and a slide mechanism that allows the pin to slide. The coupler sections 122, 122 may still instead be formed of a combination of a ring-shaped slide member and a bolt and a nut without the pivotal shafts 123 each having a rod-like shape.

Therefore, in the projector 100, the projection section body 120 is supported by a two-axis pivot mechanism formed of the coupler section 131, which pivots around the axial line A, and the coupler sections 122, 122, which pivot around the axial line B.

The projector 100 can be connected to a duct 200, which is fixed to a ceiling surface, a wall surface, or any other installation surface. The duct 200 is a watershoot-shaped power supply called a lighting duct and corresponds to a power source common duct, a duct for a power source, or a duct for a lighting apparatus according to the JIS C8366 standard. A lighting apparatus, an adapter for power supply, and any other component can be attached to the duct 200. Although FIG. 1 shows a cross section of the duct 200 for ease of understanding, the duct 200 does not need to open at the ends thereof. The duct 200 is installed on a ceiling surface or a wall surface, is connected to a commercial power supply (not shown), and supplies the lighting apparatus and the adapter described above with electric power.

The duct 200 has a hollow body having an elongated shape and an opening 201, which extends in the longitudinal direction, and supports a connector or any other component inserted through the opening 201. When the duct 200 is fixed to a ceiling surface, the opening 201 faces downward, and a lighting apparatus or any other apparatus can be attached from below and hanged downward. The duct 200 may instead be fixed to a wall surface. In this case, the opening 201 faces horizontally, and a lighting apparatus or any other apparatus can be attached sideways and fixed to the duct 200.

The duct 200 has a pair of conductors 205, 205, which extend in the longitudinal direction of a body of the duct 200. Each of the conductors 205, 205 is made of copper or any other metal formed into a rod-like or tape-like shape and electrically connected to a commercial power source. The conductors 205, 205 are connected, for example, to a commercial 100-V, two-pole, AC power source with one of the conductors 205 serving as a grounded pole and the other conductor 205 serving as a non-grounded pole. Further, the duct 200 has grooves 206, 206, which lock a member wider than the opening 201. The grooves 206, 206 are located in the duct 200 on opposite sides of the opening 201, and an object that fits into the grooves 206, 206 is supported by the duct 200.

The power source accommodation section 110 has a connector 115 (connector section), which is disposed on the upper surface of the enclosure of the power source accommodation section 110 and can be coupled to the duct 200. The connector 115 is a protrusion having a substantially cylindrical shape and protruding upward from the upper surface of the enclosure, and a pair of locking pieces 116, 116 and a pair of contact conductors 117, 117 are provided on the side surfaces of the connector 115 and extend sideways therefrom.

The locking pieces 116, 116 are each formed into a flat-plate-like shape and protrude from the connector 115 in opposite directions. The contact conductors 117, 117 are each made of copper or any other metal and formed into a flat-plate-like shape and protrude from the connector 115 in opposite directions.

The locking pieces 116 and the contact conductors 117 protrude in the same direction from the connector 115, as shown in FIGS. 2A and 2B. That is, the locking pieces 116, 116 and the contact conductors 117, 117 protrude in the depth direction of the power source accommodation section 110 and are perpendicular to the longitudinal direction of the enclosure of the power source accommodation section 110.

To attach the projector 100 to the duct 200, the connector 115 is inserted into the opening 201. At this point, the connector 115 is so inserted into the opening 201 that the locking pieces 116, 116 and the contact conductors 117, 117 are oriented in the longitudinal direction of the duct 200. After the locking pieces 116, 116 and the contact conductors 117, 117 are inserted into the duct 200, rotating the power source accommodation section 110 by 90 degrees around the axial line A connects the connector 115 to the duct 200. The rotation of the power source accommodation section 110 allows the contact conductors 117, 117 to come into contact with and become electrically continuous with the conductors 205, 205 in the duct 200, whereby the conductors 205, 205 can supply the contact conductors 117, 117 with electric power. Further, since the locking pieces 116, 116 fit into the grooves 206, 206, the connector 115 is fixed to the duct 200 via the locking pieces 116, 116. In this state, the connector 115 does not move also in the longitudinal direction of the duct 200.

As described above, providing the connector 115 allows the power source accommodation section 110 to be readily attached to the duct 200. In the state in which they are thus attached to each other, the longitudinal direction of the enclosure of the power source accommodation section 110 coincides with (is parallel to) the direction in which the duct 200 extends. As a result, the power source accommodation section 110 appears to be integrated with the duct 200 and hence advantageously does not greatly attract attention.

In the state in which the projector 100 is attached to the duct 200, the entire projector 100 is supported by the duct 200 via the connector 115. In the power source accommodation section 110, the coupler section 131 is disposed directly below (immediately below) the connector 115. In other words, the connector 115 extends upward along the axial line A, which is the center of the pivotal motion of the coupler section 131.

In this configuration, when the projector 100 is attached from below to the duct 200, which is horizontally installed on a ceiling surface, and the projector 100 is hanged downward, the entire weight of the projector 100 is applied to the connector 115 in the form of a load in the vertical direction. That is, irrespective of the state of the projection section body 120, the weight of the projection section body 120 is applied to the power source accommodation section 110 via the coupler section 131. Since the coupler section 131 is positioned directly below the connector 115, the weight of the projection section body 120 and the support member 130 plus the weight of the power source accommodation section 110 acts on the connector 115 in the vertical direction. No rotational force is therefore applied to the connector 115, whereby a state in which stress concentration occurs in part of the locking pieces 116, 116 and the contact conductors 117, 117 can be avoided. As a result, the burden on the duct 200 and the connector 115 can be reduced, and the projector 100 can be reliably fixed.

A projection port 128 is provided on the front side (in the front surface) of the projection section body 120 as shown in FIG. 2A. The projection port 128 is an opening through which image light from a projection section 125 (FIG. 3), which is built in the projection section body 120, passes, and to which a lens or any other component is attached.

In the state in which the projector 100 is fixed to the duct 200, which is attached to a ceiling surface, causing the support member 130 to pivot at the coupler section 131 allows the orientation of the projection port 128, that is, the projection direction to be changed around the axial line A and adjusted to an arbitrary direction. Further, causing the projection section body 120 to pivot at the coupler sections 122, 122 allows the projection direction to be changed around the axial line B to an arbitrary direction. As described above, the projector 100 is so configured that the projection direction can be changed horizontally and vertically around the two axes.

The contact conductors 117, 117 are connected to the power source circuit 24 (FIG. 4) accommodated in the power source accommodation section 110 via conductors (not shown) buried in the connector 115. When the power source accommodation section 110 is connected to the duct 200, AC-100V electric power is supplied to the power source circuit 24 (power supply section), allowing the projector 100 to operate.

Figure 3:
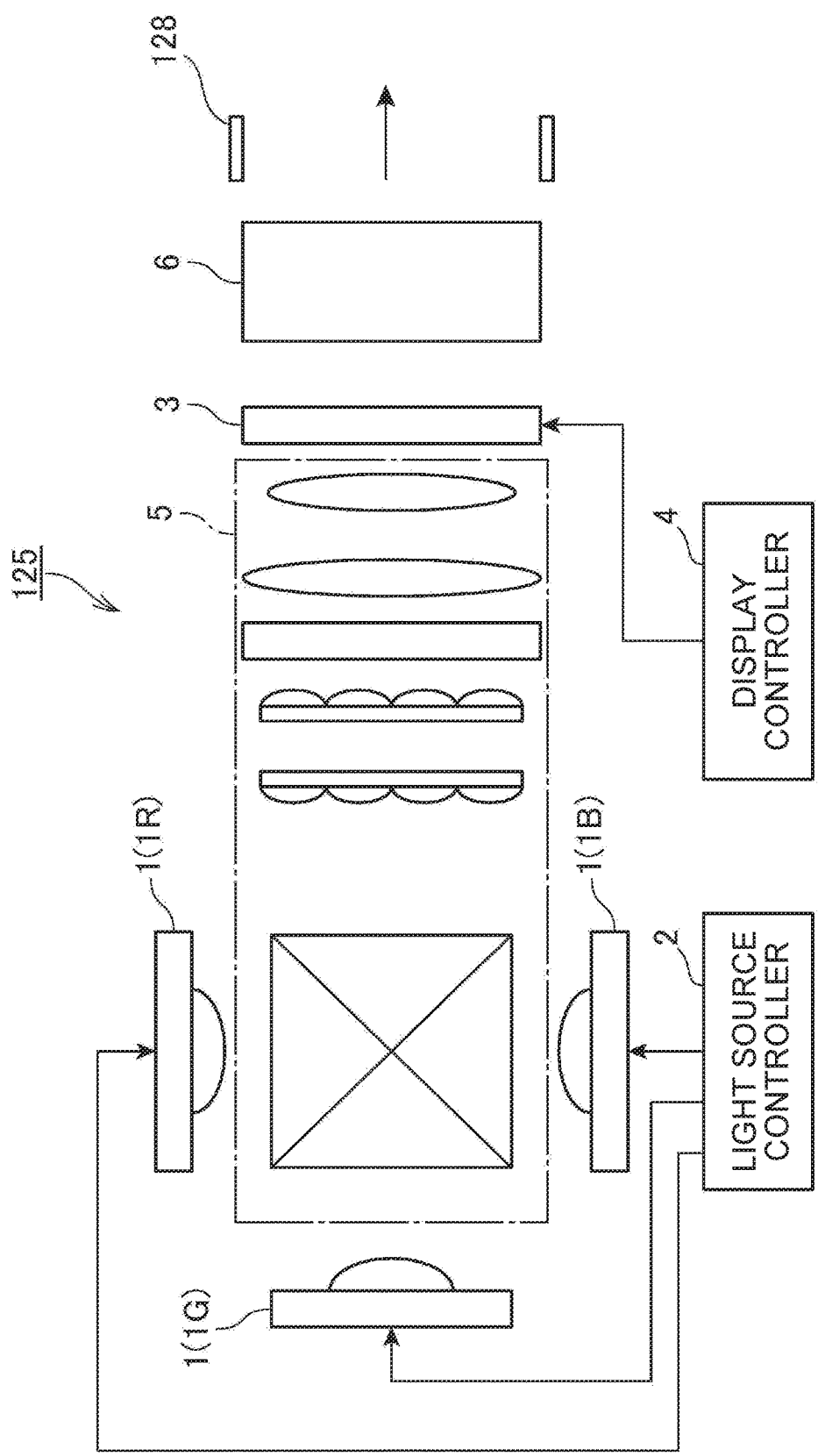
FIG. 3 diagrammatically shows the configuration of a projection section.

FIG. 3 diagrammatically shows the configuration of the projection section 125 accommodated in the projection section body 120.

The projection section 125 includes a light source 1, a light modulator 3, an irradiation system 5, and a projection system 6. The light source 1 is connected to a light source controller 2, which drives the light source 1, and the light modulator 3 is connected to a display controller 4.

The light source 1 includes an LED corresponding to R (red light), an LED corresponding to G (green light), and an LED corresponding to B (blue light) and emits light under the control of the light source controller 2. The light source controller 2 outputs pulses that cause each of the LEDs in the light source 1 to emit light, and the light source 1 alternately repeats a light emission state and a no-light emission state at the frequency of the input pulses. The light source controller 2 can adjust the luminance of the light emitted from each of the LEDs by changing the frequency of the pulses outputted to the light source 1.

The light source 1 may include LEDs corresponding to four or more element colors different from each other, may include LEDs corresponding to two element colors different from each other, or may include a single LED that emits white light. Further, the light source 1 may include organic or inorganic semiconductor lasers, organic EL (electro-luminescent) devices, or fluorophores excited by LED or laser light sources in place of the LEDs. The light source 1 may still instead include a high-pressure mercury lamp or a xenon lamp.

The irradiation system 5 collects the light emitted from the light source 1 to form parallelized light, with which the light modulator 3 is irradiated. The irradiation system 5, specifically, a dichroic prism combines the optical paths of the light (light beams) from the three LEDs (1R, 1G, and 1B) provided in the light source 1. The light having exited out of the dichroic prism is converted into parallelized light by an optical integration system including a fly's eye lens. The parallelized light passes through a polarization conversion element and is incident on the light modulator 3.

The light modulator 3 is a single-plate transmissive liquid crystal light valve. The liquid crystal light valve in the present embodiment includes a pair of polarizers and a liquid crystal panel positioned therebetween. The display controller 4 drives the liquid crystal panel in the light modulator 3 to write an image to the liquid crystal panel. The light sources 1R, 1G, and 1B and the light modulator 3 are driven based on an RGB sequential method, that is, a color sequential method. The projector 100 can thus project a full-color image.

The modulated light (image light) from the light modulator 3 is projected through the projection port 128 toward a wall, a screen, or any other projection surface.

Figure 4:
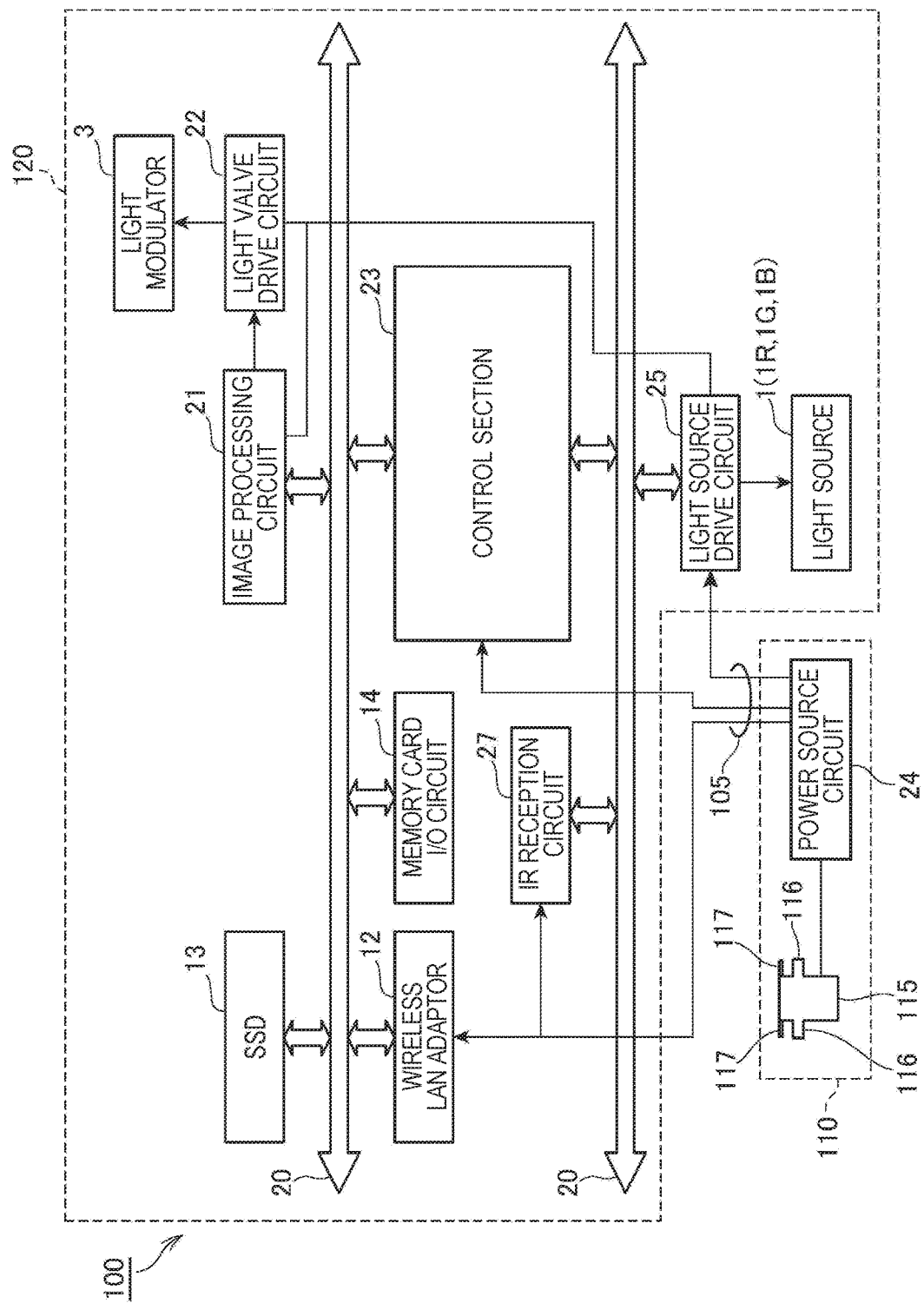
FIG. 4 is a functional block diagram of the projector.

FIG. 4 is a functional block diagram of the projector 100.

The projector 100 includes the power source circuit 24, which is accommodated in the power source accommodation section 110, and a control system formed of portions accommodated in the projection section body 120.

The control system accommodated in the projection section body 120 includes a control section 23. The control section 23 includes a CPU, a ROM, a RAM, a nonvolatile memory, a system controller, and other peripheral circuits (neither of them is shown). The nonvolatile memory stores operating software and application software, and the ROM stores a BIOS. The control section 23, specifically, the CPU executes the BIOS stored in the ROM and the operating software and the application software stored in the nonvolatile memory to control the projector.

The following components are connected to the control section 23 via a bus 20: a wireless LAN adaptor 12; an SSD (solid state drive) 13; and a memory card I/O (input/output) circuit 14.

The wireless LAN adaptor 12 performs communication in compliance with a wireless LAN communication standard (IEEE 802.11, for example) under the control of the control section 23. The projector 100 wirelessly communicates with an external apparatus (not shown) via the wireless LAN adapter 12 to acquire image data from the external apparatus. Examples of the external apparatus may include a server computer, a personal computer, a tablet computer, a smart-phone, a mobile phone, and a variety of other apparatus.

The SSD 13 is a storage apparatus that stores data in a flash memory device. The SSD 13 stores a variety of data in a nonvolatile, rewritable manner under the control of the control section 23. The memory card I/O circuit 14 is connected to a memory card slot (not shown) provided in the projection section body 120. The memory card slot (not shown) can be provided, for example, on the rear side of the projection section body 120 (FIG. 1), and a card-type storage medium can be loaded and unloaded to and from the memory card slot with the projector 100 attached to the duct 200. The memory card I/O circuit 14 accesses the card-type storage medium (not shown) inserted into the memory card slot, reads data recorded on the storage medium, and writes data to the storage medium under the control of the control section 23.

The control section 23 can read image data via the SSD 13 or the memory card I/O circuit 14 and project an image based on the read image data. Further, the control section 23 can receive image data from the external apparatus via the wireless LAN adapter 12 and project an image based on the received image data. Moreover, the control section 23 may store the image data received from the external apparatus via the wireless LAN adapter 12 in the SSD 13 or in the card-type storage medium via the memory card I/O circuit 14. Image data to be processed by the control section 23 may be still image data or motion image (video image) data. The data format and other factors of the image data can be arbitrary selected.

The following components are further connected to the control section 23: an image processing circuit 21; a light valve drive circuit 22; a light source drive circuit 25; and an IR reception circuit 27.

The image processing circuit 21 reads image data to be projected, performs resolution conversion, color correction, trapezoidal correction, and a variety of types of other processing on the image data, and outputs the processed image data to the light valve drive circuit 22 on a frame basis under the control of the control section 23. The light valve drive circuit 22 provides the light modulator 3 with a drive signal that drives the liquid crystal panel in accordance with the image data inputted on a frame basis from the image processing circuit 21. An image is drawn in the liquid crystal panel in the light modulator 3 in accordance with the drive signal outputted from the light valve drive circuit 22, and the drawn image modulates the light emitted from the light source 1. The control section 23, the image processing circuit 21, and the light valve drive circuit 22 cooperate with each other to function as the display controller 4 (FIG. 3).

The light source drive circuit 25 outputs a drive signal to the light source 1 to cause the light source 1 to emit light under the control of the control section 23. The control section 23 and the light source drive circuit 25 cooperate with each other to function as the light source controller 2 (FIG. 3).

The IR reception circuit 27 receives an infrared signal transmitted from a remote controller (not shown), decodes the infrared signal, produces operation data corresponding to operation performed on the remote controller, and outputs the operation data to the control section 23.

The wireless LAN adapter 12, the SSD 13, the memory card I/O circuit 14, the image processing circuit 21, the light valve drive circuit 22, the control section 23, and the IR reception circuit 27, which form the control system of the projector 100, are implemented on a control substrate (not shown). The control substrate and the portions that form the projection section 125 are fixed to a frame (not shown) in the projection section body 120.

The power source circuit 24 receives, for example, single-phase, two-pole, AC-100V electric power through the contact conductors 117, 117 provided on the connector 115. The power source circuit 24 supplies the portions in the control system of the projector 100 with low-voltage electricity. For example, the power source circuit 24 supplies the wireless LAN adapter 12, the SSD 13, the memory card I/O circuit 14, the image processing circuit 21, the light valve drive circuit 22, the control section 23, and the IR reception circuit 27 with 5-V or 3.3-V DC current. The power source circuit 24 can also supply higher voltage electric power. For example, the power source circuit 24 supplies the three LEDs provided in the light source 1, the light source drive circuit 25, which causes the light source 1 to emit light, and the liquid crystal panel in the light modulator 3 with 12-V DC current.

As described above, to supply the portions in the projector 100 with necessary electric power, the power source circuit 24 includes an AC-DC conversion circuit, a voltage conversion circuit including a transformer and a switching circuit, and other types of circuit.

In the thus configured projector 100, the support member 130 is made of a material having high heat conductivity, such as a metal.

Further, the coupler section 131 preferably couples the support member 130 to a frame made of a metal in the power source accommodation section 110 via a member having high heat conductivity, such as a volt or a support shaft made of a metal, to conduct heat generated in the power source accommodation section 110 to the support member 130. Instead of the configuration described above, the power source accommodation section 110 may include a metal enclosure with which the support member 130 is in contact or to which the support member 130 is coupled, for example, via a volt or a support shaft made of a metal.

In this case, heat generated by the power source circuit 24 accommodated in the power source accommodation section 110 is conducted to the support member 130. Since the power source circuit 24 includes a transformer, a switching circuit, and other components that generate a large amount of heat, the power source accommodation section 110 generates a large amount of heat. In view of the fact described above, heat dissipating slits 119 are formed on the front side of the power source accommodation section 110, as shown in FIGS. 1 and 2A, encouraging heat dissipation from the power source circuit 24. In addition to the heat dissipation through the slits 119, the heat from the power source accommodation section 110 can be conducted to the support member 130, which is exposed to the atmosphere, and dissipated through the surface of the support member 130. The heat generated by the power source circuit 24 can thus be efficiently dissipated.

The heat generated by the power source circuit 24 can therefore be sufficiently dissipated, which prevents the power source circuit 24 from being overheated, for example, without provision of a heat dissipating fan in the power source accommodation section 110, whereby the projector 100 can operate in a stable manner. Instead, a heat dissipating fan can be provided in the power source accommodation section 110. In this case, the heat dissipation effect provided by the support member 130 can reduce the amount of heat dissipation required for the heat dissipating fan. As a result, the heat dissipating fan can be a compact one and can be driven at a reduced revolution speed for reduction in noisy sound.

Further, each of the coupler sections 122, 122 also preferably couples the support member 130 to a frame (not shown) that supports the portions in the projection section 125 and other components in the projection section body 120 via a member having high heat conductivity, such as a volt or a support shaft made of a metal. Instead of the configuration described above, the projection section body 120 may include a metal enclosure with which the support member 130 is in contact or to which the support member 130 is coupled, for example, via a volt or a support shaft made of a metal. In this configuration, heat generated in the projection section body 120 is conducted to the support member 130.

The light source 1 and the light modulator 3 in the projection section 125 generate heat when they project an image. Further, the portions in the control system that are implemented on the control substrate in the projector 100 also generate heat when the projector 100 is in operation. A large amount of heat is thus generated in the projection section body 120. The heat is conducted to the support member 130 and dissipated through the surface of the support member 130, whereby the heat generated by the projection section 125 and the control system of the projector 100 can be efficiently dissipated.

As a result, the heat generated by the projection section 125 and the control substrate can be sufficiently dissipated, which prevents the portions in the projection section body 120 from being overheated, for example, without provision of a heat dissipating fan in the projection section body 120, whereby the projector 100 can operate in a stable manner. Instead, a heat dissipating fan can be provided in the projection section body 120. In this case, the heat dissipation effect provided by the support member 130 can reduce the amount of heat dissipation required for the heat dissipating fan. As a result, the heat dissipating fan can be a compact one and can be driven at a reduced revolution speed for reduction in noisy sound.

As described above, the projector 100 according to the first embodiment to which the invention is applied includes the power source accommodation section 110 and the projection section body 120. The power source accommodation section 110 is supported by the duct 200 and accommodates the power source circuit 24, which converts electric power supplied from the duct 200, and the projection section body 120 accommodates the projection section 125, which projects an image, and is so supported by the power source accommodation section 110 that the image projection direction is adjustable. To change the projection direction in this configuration, the projection section body 120, which is lightweight because the power source circuit 24 is not accommodated therein but is separated therefrom, only needs to be moved. Further, the power source circuit 24 includes not only a transformer and a switching circuit as described above but also a heat sink or any other similar component for appropriately dissipating heat from these components. The power source circuit 24, which is therefore a heavy component, does not need to be moved when the projection direction is changed because the power source circuit 24 is separate from the projection section body 120.

The coupler section 131 and the coupler sections 122, 122, which support the projection section body 120, only need to support and fix the projection section body 120 excluding the weight of the power source circuit 24. Since the burden on the coupler section 131 and the coupler sections 122, 122 is thus reduced and hence load capacity requirements are lowered, the coupler section 131 and the coupler sections 122, 122 can be designed with an increased degree of freedom. For example, a structure that allows the angle of the projection section 125 to be changed over a wide range and has other advantages can be employed. Further, since the power source accommodation section 110 is supported by the duct 200, no cable or any other component that allows the duct 200 to provide the power source accommodation section 110 with electric power needs to be separately provided, whereby the structure can be simplified and the power source accommodation section 110 can be securely held. Therefore, the projector 100 provided in the present embodiment can be securely attached to a ceiling surface or any other surface and allows the image projection direction to be readily adjusted over a wide range.

Further, the power source accommodation section 110 includes the enclosure having a longitudinally elongated shape and the connector 115 extending upward from the enclosure and connected to the duct 200 having a watershoot shape, and the connector 115 is fixed to the duct 200 with the enclosure extending in the longitudinal direction of the duct 200. As a result, the power source accommodation section 110 can be attached to the watershoot-shaped duct 200, such as what is called a lighting apparatus duct and a power source duct, whereby the position where the projector is attached can be readily changed in the longitudinal direction of the duct 200. Further, since the enclosure of the power source accommodation section 110 extends in the longitudinal direction of the duct 200, the projector 100 can be so attached that it does not greatly attract attention.

Moreover, the projector 100 includes the support member 130, which is coupled to the power source accommodation section 110 and the projection section body 120 and allows the power source accommodation section 110 to support the projection section body 120. The support member 130 is connected to the power source accommodation section 110 via the coupler section 131 in a position directly below the connector 115. As a result, since the load applied to the connector 115 is substantially limited to a load in the vertical direction, the burden on the connector 115 can be reduced, whereby the structure of the connector 115 can be simplified.

Further, the support member 130 is so coupled to at least one of the power source accommodation section 110 and the projection section body 120 that heat can be conducted via the coupler section 131 or the coupler sections 122, 122. The support member 130 can therefore dissipate heat generated by the power source circuit 24 in the power source accommodation section 110 and/or heat generated by the projection section 125 and other components in the projection section body 120. Therefore, not only can the heat dissipation performance of the projector 100 be enhanced and hence the projector 100 operates in a stable manner, but also a compact cooling fan or no cooling fan can be used.

Further, since the light source 1 is accommodated in the projection section body 120, the configuration that couples the power source accommodation section 110 and the projection section body 120 to each other can be simplified, whereby the range over which the projection section body 120 is movable can be increased and other advantages are provided.

It is now noted that a configuration in which the power source accommodation section 110 accommodates the light source 1 can instead be employed. In this case, the projection section 125 is formed of the light source 1 accommodated in the power source accommodation section 110 and a light guide (light guide section) that guides the light emitted from the light source 1 into the projection section body 120, such as an optical fiber, and the light guided through the light guide is guided to the light modulator 3 via the irradiation system 5. This configuration, in which the power source accommodation section 110 accommodates the light source 1, allows further reduction in the weight of the projection section body 120. As a result, the burden on the coupler section 131 and the coupler sections 122, 122, which support the projection section body 120, can be further reduced and hence the coupler sections can be designed with an increased degree of freedom, whereby a structure that allows the angle of the projection section 125 can be changed over a wide range and has other advantages can be employed.

Second Embodiment

Figure 5:
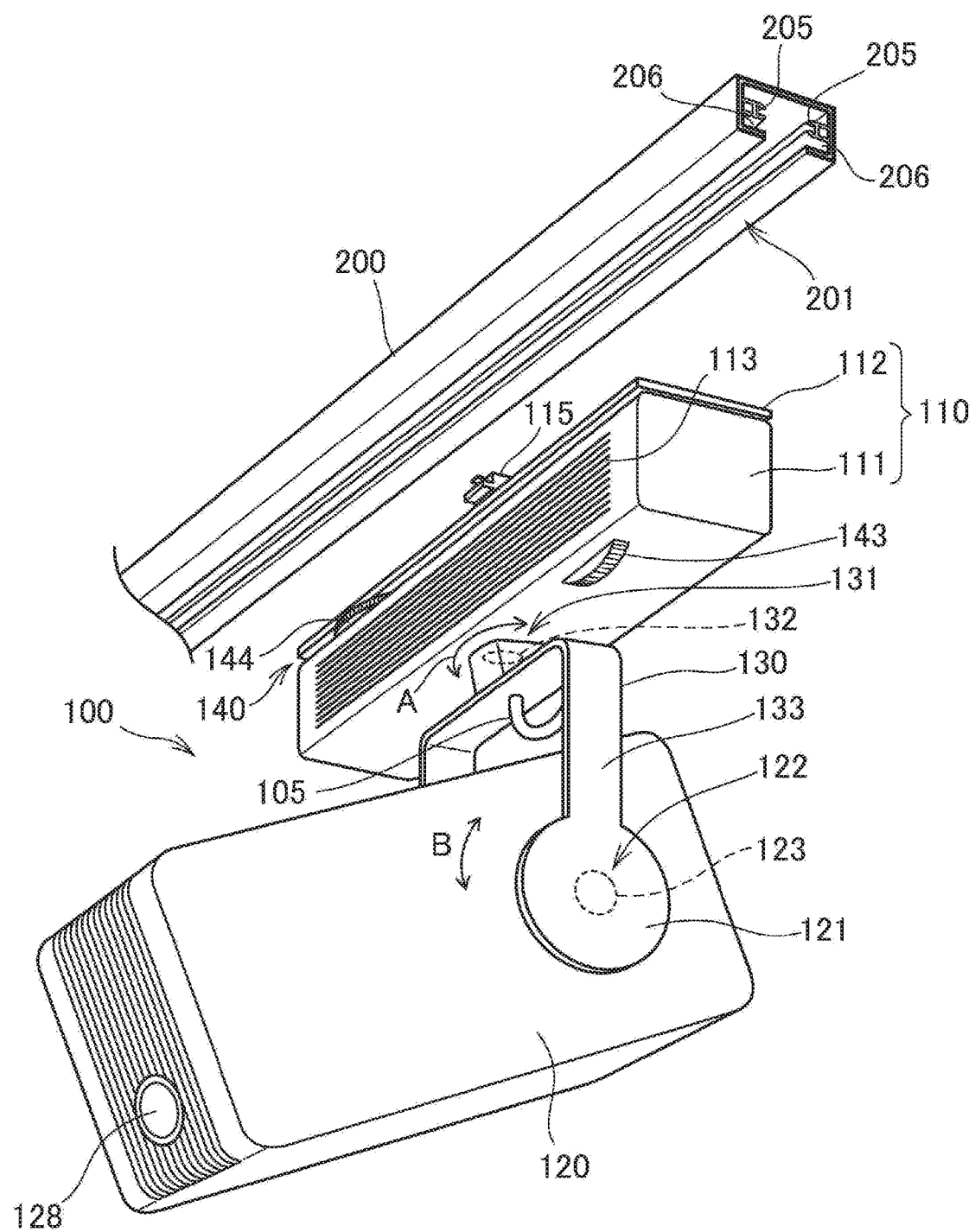
FIG. 5 is a perspective view of a projector according to a second embodiment.
Figure 6A:
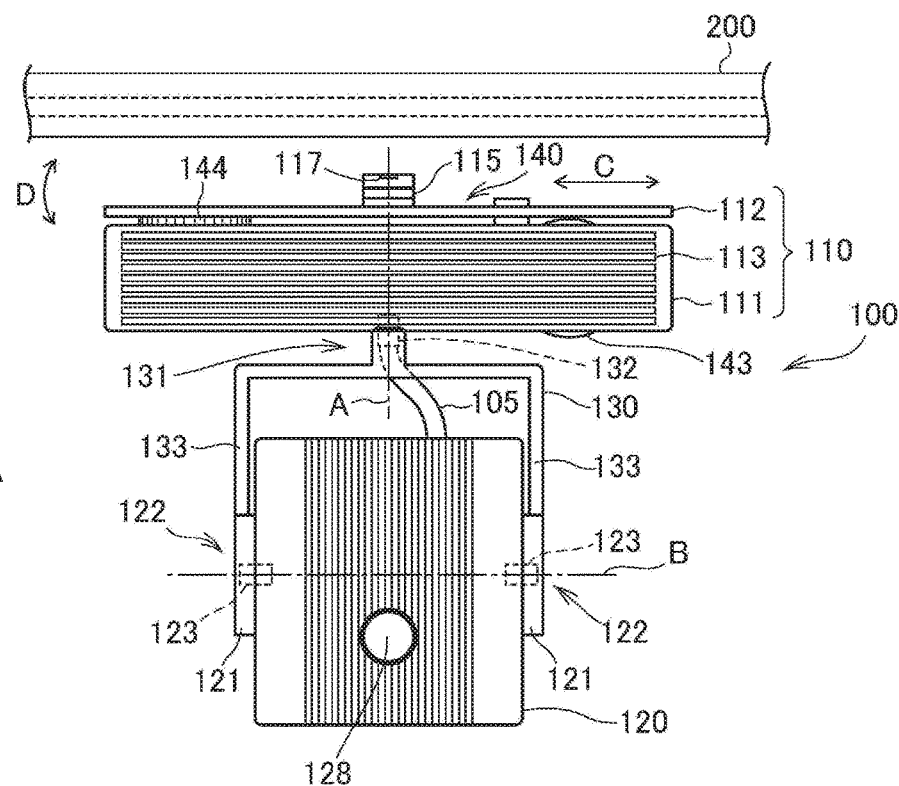
FIGS. 6A and 6B show the configuration of the projector according to the second embodiment.
Figure 6B:
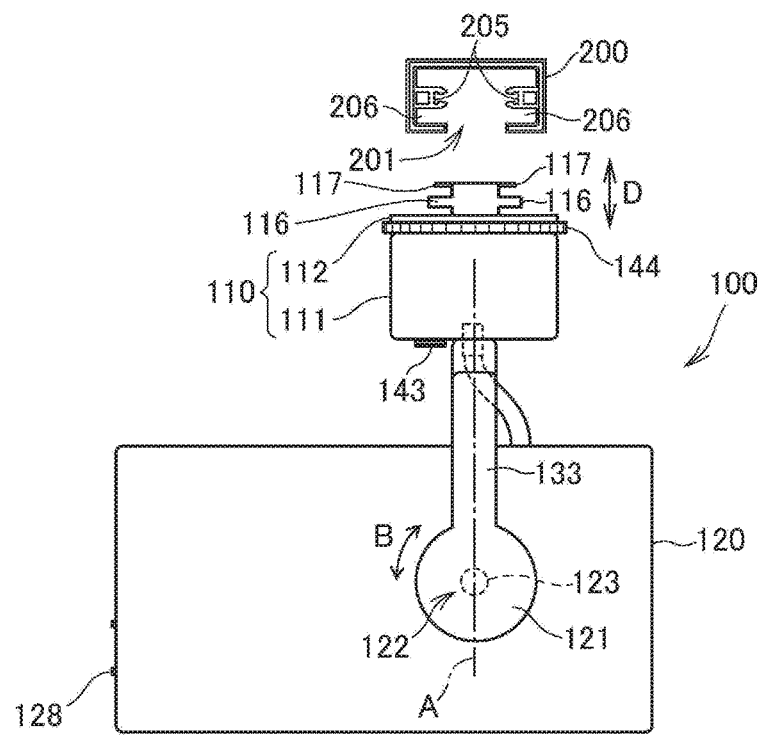

FIGS. 5, 6A, and 6B show the configuration of a projector 100 according to a second embodiment to which the invention is applied. FIG. 5 is a perspective view. FIG. 6A is a front view, and FIG. 6B is a side view. FIGS. 5, 6A, and 6B also show a duct 200, to which the projector 100 is attached.

The projector 100 includes a power source accommodation section 110 (mounter section), a projection section body 120, which is separate from the power source accommodation section 110, and a support member 130 (support section), which couples the power source accommodation section 110 and the projection section body 120 to each other. The power source accommodation section 110 includes a power source accommodation section body 111, which has an elongated, substantially box-like shape, a seating section 112, which is connected to the duct 200, and a support mechanism 140, via which the power source accommodation section body 111 is coupled to the seating section 112.

The power source accommodation section body 111 has an enclosure that accommodates the power source circuit 24 (FIG. 4). On the other hand, the projection section body 120 has a substantially box-shaped enclosure that accommodates the projection section 125 (FIG. 3). On the other hand, the seating section 112 is a flat-plate-shaped member having substantially the same size and shape as those of the upper surface of the power source accommodation section body 111 in a plan view.

The support member 130 is coupled to the bottom surface of the power source accommodation section body 111 via a coupler section 131. The coupler section 131 supports the support member 130 in such a way that the coupler section 131 couples the upper end of the support member 130 to the bottom surface of the power source accommodation section body 111 and the support member 130 is pivotal around a pivotal shaft 132. In FIGS. 5, 6A, and 6B, the arrow A indicates the direction in which the coupler section 131 pivots, and the dashed line A indicates an axial line corresponding to the center of the pivotal motion. Further, the coupler section 131 can fix the support member 130 to the power source accommodation section body 111 at an arbitrary position in the pivotal direction. The coupler section 131 therefore allows the support member 130 to pivot relative to the power source accommodation section 110 to a point where the projection section body 120 is oriented in an arbitrary direction and then the support member 130 to be fixed to the power source accommodation section 110.

The coupler section 131 can be formed, for example, of a panel that forms the enclosure of the power source accommodation section body 111 or a frame in the power source accommodation section body 111, the pivotal shaft 132, and a bolt and a nut that can be so fastened that they restrict the pivotal motion around the pivotal shaft 132. The coupler section 131 may instead be formed of a bearing, a pin that stops pivotal motion produced by the bearing, and a slide mechanism that allows the pin to slide. The coupler section 131 may still instead be formed of a combination of a ring-shaped slide member and a bolt and a nut without the pivotal shaft 132 having a rod-like shape.

A lower portion of the support member 130 bifurcates into two arm portions 133, 133, which extend downward. Lower end portions of the arm portions 133, 133 form flat plate portions 121, 121. The flat plate portions 121, 121 are in contact with the opposite side surfaces of the projection section body 120 and coupled to the projection section body 120 via coupler sections 122, 122. The coupler sections 122, 122 support the projection section body 120 in such a way that the coupler sections 122, 122 couple the flat plate portions 121, 121 to the side surfaces of the projection section body 120 and the flat plate portions 121, 121 are pivotal around pivotal shafts 123. In FIGS. 5, 6A, and 6B, the arrow B indicates the direction in which the coupler sections 122, 122 pivot, and the dashed line B indicates an axial line corresponding to the center of the pivotal motion. Further, the coupler sections 122, 122 can fix the flat plate portions 121, 121 to the projection section body 120 at an arbitrary position in the pivotal direction. The coupler sections 122, 122 therefore allow the projection section body 120 to pivot relative to the support member 130 to a point where the projection section body 120 is oriented in an arbitrary direction and then the projection section body 120 to be fixed to the support member 130.

The coupler sections 122, 122 can be formed, for example, of a panel that forms the enclosure of the projection section body 120 or a frame in the projection section body 120, the pivotal shafts 123, and a bolt and a nut that can be so fastened that they restrict the pivotal motion around the pivotal shafts 123. The coupler sections 122, 122 may instead be formed of a bearing, a pin that stops pivotal motion produced by the bearing, and a slide mechanism that allows the pin to slide. The coupler sections 122, 122 may still instead be formed of a combination of a ring-shaped slide member and a bolt and a nut without the pivotal shafts 123 each having a rod-like shape.

Therefore, in the projector 100, the projection section body 120 is supported by a two-axis pivot mechanism formed of the coupler section 131, which pivots around the axial line A, and the coupler sections 122, 122, which pivot around the axial line B. The coupler section 131 and the coupler sections 122, 122 form an angle adjustment mechanism.

The seating section 112, which forms an upper portion of the power source accommodation section 110, has a connector 115 (connector section), which is disposed on the upper surface of the seating section 112 and can be coupled to the duct 200. The connector 115 is a protrusion having a substantially cylindrical shape and protruding upward from the upper surface of the seating section 112, and a pair of locking pieces 116, 116 and a pair of contact conductors 117, 117 are provided on the side surfaces of the connector 115 and extend sideways therefrom.

The locking pieces 116, 116 are each formed into a flat-plate-like shape and protrude from the connector 115 in opposite directions. The contact conductors 117, 117 are each made of copper or any other metal and formed into a flat-plate-like shape and protrude from the connector 115 in opposite directions.

The locking pieces 116 and the contact conductors 117 protrude in the same direction from the connector 115, as shown in FIGS. 6A and 6B. That is, the locking pieces 116, 116 and the contact conductors 117, 117 protrude in the depth direction of the power source accommodation section 110 and are perpendicular to the longitudinal direction of the enclosure of the power source accommodation section 110, that is, the power source accommodation section body 111.

The support mechanism 140, which couples the power source accommodation section body 111 and the seating section 112 of the power source accommodation section 110 to each other, displaces the power source accommodation section body 111 and the seating section 112 relative to each other in a specific direction, as will be described later. The power source accommodation section body 111 and the seating section 112 are, however, fixed to each other in the direction of the pivotal motion that occurs when the connector 115 is attached to the duct 200, that is, the pivotal motion around the axial line A. Therefore, rotating the entire power source accommodation section 110 by 90 degrees allows the power source accommodation section 110 to be readily attached to the duct 200.

As described above, the connector 115 allows the projector 100 to be readily attached to the duct 200. In the state in which they are thus attached to each other, the longitudinal direction of the enclosure of the power source accommodation section 110 (power source accommodation section body 111) coincides with (is parallel to) the direction in which the duct 200 extends. As a result, the power source accommodation section 110 appears to be integrated with the duct 200 and hence advantageously does not greatly attract attention.

In the state in which the projector 100 is attached to the duct 200, the entire projector 100 is supported by the duct 200 via the connector 115. In the power source accommodation section 110, the coupler section 131 is disposed directly below (immediately below) the connector 115. In other words, the connector 115 extends upward along the axial line A, which is the center of the pivotal motion of the coupler section 131.

In this configuration, when the projector 100 is attached from below to the duct 200, which is installed horizontally on a ceiling surface, and the projector 100 is hanged downward, the entire weight of the projector 100 is applied to the connector 115 in the form of a load in the vertical direction. That is, irrespective of the state of the projection section body 120, the weight of the projection section body 120 is applied to the power source accommodation section body 111 via the coupler section 131. Since the coupler section 131 is positioned directly below the connector 115, the weight of the projection section body 120 and the support member 130 plus the weight of the power source accommodation section 110 acts on the connector 115 in the vertical direction. No rotational force is therefore applied to the connector 115, whereby a state in which stress concentration occurs in part of the locking pieces 116, 116 and the contact conductors 117, 117 can be avoided. As a result, the burden on the duct 200 and the connector 115 can be reduced, and the projector 100 can be reliably fixed.

A projection port 128 is provided on the front side (in the front surface) of the projection section body 120 as shown in FIG. 6A. The projection port 128 is an opening through which image light from a projection section 125 (FIG. 3), which is built in the projection section body 120, passes, and to which a lens or any other component is attached.

In the state in which the projector 100 is fixed to the duct 200, which is attached to a ceiling surface, causing the support member 130 to pivot at the coupler section 131 allows the orientation of the projection port 128, that is, the projection direction to be changed around the axial line A and adjusted to an arbitrary direction. Further, causing the projection section body 120 to pivot at the coupler sections 122, 122 allows the projection direction to be changed around the axial line B to an arbitrary direction. As described above, the projector 100 is so configured that the projection direction can be changed horizontally and vertically around the two axes.

On the other hand, in the power source accommodation section 110, the support mechanism 140, which couples the power source accommodation section body 111 to the seating section 112 located above the power source accommodation section body 111, not only couples the power source accommodation section body 111 to the seating section 112 but also allows them to be moved relative to each other in a limited direction.

Specifically, the power source accommodation section body 111 is slidable relative to the seating section 112 in the direction indicated by the arrow C in FIG. 6A and can be fixed to the seating section 112 in an arbitrary position in the slide direction. Further, the power source accommodation section body 111 is pivotal relative to the seating section 112 along an arcuate path in the direction indicated by the arrow D in FIGS. 6A and 6B and can be fixed to the seating section 112 in an arbitrary position in the pivotal direction. This motion of the power source accommodation section body 111 is rotational motion around an imaginary axial line. As described above, the support mechanism 140, which moves the power source accommodation section body 111 relative to the seating section 112 fixed to the duct 200, allows fine adjustment of the orientation of the projection section body 120, that is, the projection direction.

An operation wheel 143, which serves as an operation section that causes the power source accommodation section body 111 to slide in the direction indicated by the arrow C, is provided through the bottom surface of the power source accommodation section body 111. An operation wheel 144 is further provided between the power source accommodation section body 111 and the seating section 112 and protrudes from the front and rear sides of the power source accommodation section body 111. The operation wheel 144 is an operation section that causes the power source accommodation section body 111 to pivot in the direction indicated by the arrow D. Each of the operation wheels 143 and 144 has a large number of grooves formed in the circumferential surface thereof.

Figure 7A:
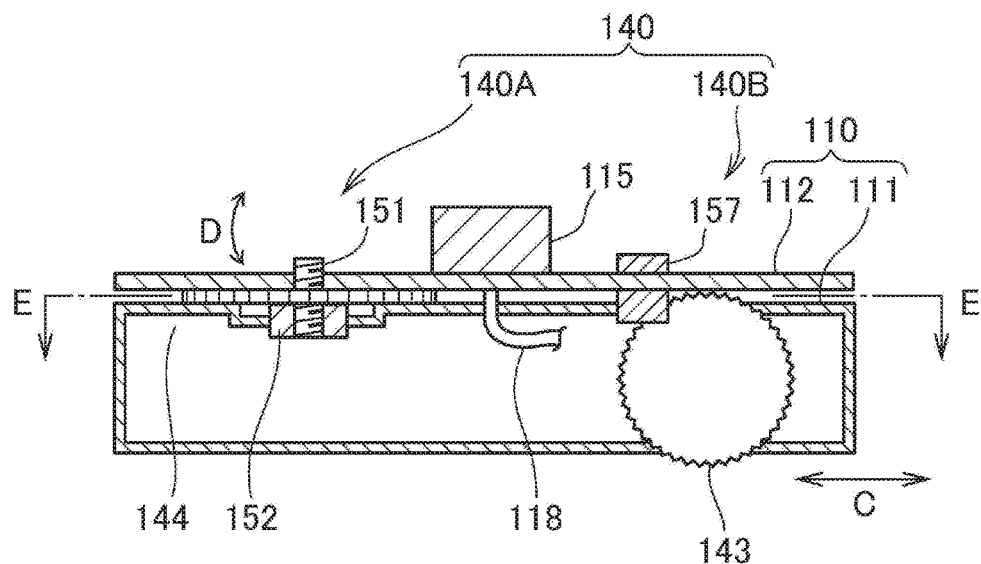
FIGS. 7A to 7C show details of a coupler structure provided in the projector according to the second embodiment.
Figure 7B:
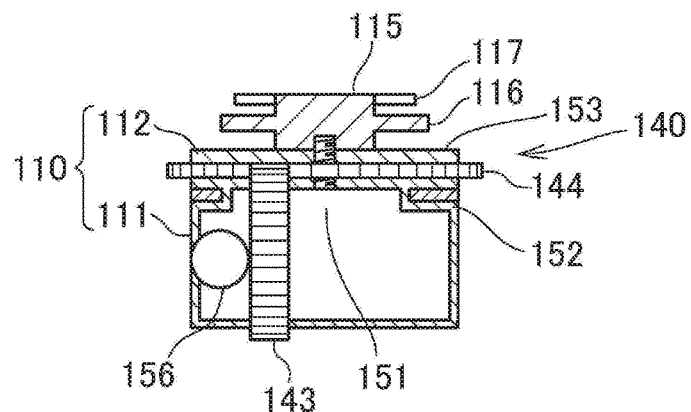
Figure 7C:
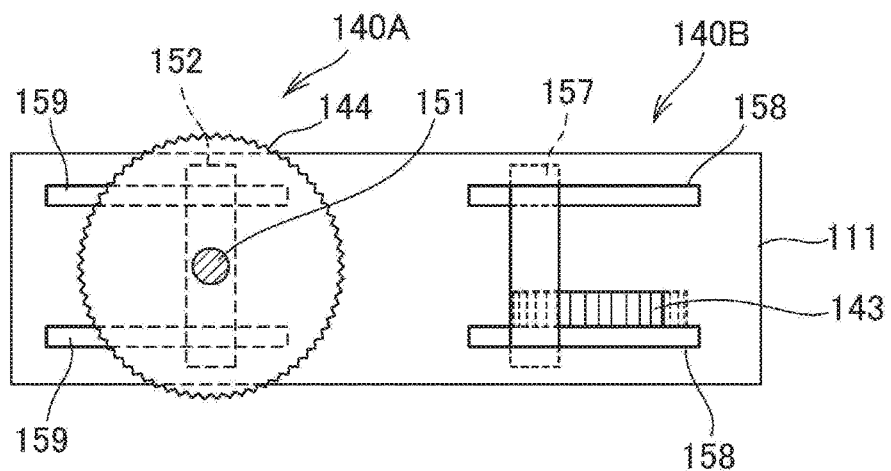

FIGS. 7A to 7C are descriptive diagrams showing the configuration of the support mechanism 140. FIG. 7A is a cross-sectional view of key portions viewed from the front. FIG. 7B is a cross-sectional view of the key portions viewed from a side. FIG. 7C is a cross-sectional view taken along the line E-E in FIG. 7A.

The support mechanism 140 is formed of a pivot mechanism 140A, which causes the power source accommodation section body 111 to pivot in the direction indicated by the arrow D, and a slide mechanism 140B, which causes the power source accommodation section body 111 to slide in the direction indicated by the arrow C.

The pivot mechanism 140A is disposed on the upper surface of the power source accommodation section body 111 and includes a support bar 152, which passes through the top surface of the power source accommodation section body 111 and reaches the interior thereof, an adjustment bolt 151, which extends upward through the support bar 152, and the operation wheel 144, into which the adjustment bolt 151 fits.

Slits 159 open through the top surface of the power source accommodation section body 111 and extend in the direction of the slide motion produced by the slide mechanism 140B, as shown in FIG. 7C. The support bar 152 is a rod-shaped member extending in the width direction of the power source accommodation section body 111 and having ends that extend downward, pass through the slits 159, and enter the power source accommodation section body 111. The lower end of the adjustment bolt 151 is fixed to the support bar 152. The operation wheel 144 is disposed between the bottom surface of the seating section 112 and the upper surface of the power source accommodation section body 111. A through hole having a female thread formed in the inner surface thereof is provided at the center of the operation wheel 144, and the adjustment bolt 151 is threaded into the through hole. When rotated, the operation wheel 144 moves upward or downward along the adjustment bolt 151.

When the operation wheel 144 is so rotated that it moves upward, the operation wheel 144 is separated from the support bar 152 because the adjustment bolt 151 is fixed to the support bar 152. In this case, the operation wheel 144 moves in the direction in which it lifts the seating section 112, resulting in a separation between the seating section 112 and the power source accommodation section body 111.

On the other hand, when the operation wheel 144 is so rotated that it moves downward, the operation wheel 141 approaches the support bar 152 and hence the seating section 112 approaches the power source accommodation section body 111. As described above, the power source accommodation section body 111 is allowed to pivot relative to the seating section 112.

The slide mechanism 140B is formed of the operation wheel 143, a support wheel 156, which supports the operation wheel 143, a hanging member 157, which is disposed in a portion ranging from the seating section 112 to part of the power source accommodation section body 111, and slits 158, through which the hanging member 157 passes.

Each of the slits 158 is an elongated hole formed through the top surface of the power source accommodation section body 111 and extending in the same direction as the slits 159. The hanging member 157 is disposed on the upper surface of the seating section 112 and has ends that extend downward through the seating section 112 and further through the slits 158 and reach the interior of the power source accommodation section body 111. The hanging member 157 supports the top surface of the power source accommodation section body 111 in such a way that the top surface is hanged below the seating section 112. The hanging member 157 is fixed to the seating section 112 but movable through the slits 158 relative to the power source accommodation section body 111. The operation wheel 143, which is disposed in the power source accommodation section body 111, has upper and lower ends extending off the power source accommodation section body 111. The upper end of the operation wheel 143 is in contact with the bottom surface of the seating section 112. Therefore, rotating the operation wheel 143 produces a force that causes the power source accommodation section body 111 and the bottom surface of the seating section 112 to slide relative to each other, and the force moves the power source accommodation section body 111.

The contact conductors 117, 117 of the connector 115 are connected to a power source cable 118 via conductors (not shown) buried in the connector 115. The power source cable 118 extends from a position directly below the connector 115 into the power source accommodation section body 111 and connects the power source circuit 24, which is accommodated in the power source accommodation section body 111, to the contact conductors 117, 117. When the power source accommodation section 110 is connected to the duct 200, AC-100V electric power is supplied to the power source circuit 24 (power supply section), allowing the projector 100 to operate. The power source cable 118 has a length long enough not to prevent the adjustment made by the support mechanism 140.

The range of the pivotal motion produced by the pivot mechanism 140A is determined by the length of the adjustment bolt 151 in the first place. The slide mechanism 140B has neither pivotal axis nor other pivotal elements. Therefore, when the pivot mechanism 140A causes the power source accommodation section body 111 to pivot, stress is induced in a portion between the hanging member 157 and the power source accommodation section body 111 and a portion between the operation wheel 143 and the seating section 112, but each of the members affected by the stress is strong enough not to be readily deformed. The range of the pivotal motion produced by the pivot mechanism 140A is therefore limited to the range of play provided between the hanging member 157 and the power source accommodation section body 111 and the range of a tolerance on a portion where the operation wheel 143 and the seating section 112 are in contact with each other.

Further, the range over which the slide mechanism 140B allows the power source accommodation section body 111 to slide is limited by the lengths of the slits 158 and 159.

The pivot mechanism 140A can change the direction in which the projection section body 120 projects an image in a direction different from both the pivotal direction of the coupler section 131 and the pivotal direction of the coupler sections 122, 122. Since the projection direction can be adjusted in a direction that cannot be achieved by the motion of the coupler section 131 or the coupler sections 122, 122, finer, more appropriate adjustment can be made. Although the range of the adjustment made by the pivot mechanism 140A is not wider than the range of the pivotal motion of the coupler section 131 or the coupler sections 122, 122, the adjustment range is wide enough, for example, to compensate inclination and distortion of a ceiling surface on which the duct 200 is installed. For example, when a ceiling surface on which the duct 200 is installed is so inclined that one end of the duct 200 is lower than the other end, the projection section body 120 is so inclined that the projection section body 120 is rotated around the optical axis of the projection port 128. The inclination results in in-plane inclination of a projected image projected on a wall or a screen, that is, inclination in a direction in which the image is rotated. The inclination cannot be corrected by the coupler section 131 or the coupler sections 122, 122 but can be adequately corrected by the pivot mechanism 140A. Further, since a user can operate the pivot mechanism 140A while looking at an image projected by the projector 100, whereby the inclination of the image can be more readily corrected.

The slide mechanism 140B causes the projection section body 120 to slide in terms of position, unlike the coupler section 131, the coupler sections 122, 122, and the pivot mechanism 140A. The direction of the slide motion corresponds to the longitudinal direction of the duct 200, which means that the same adjustment effect provided by the slide mechanism 140B is achieved by temporarily detaching the projector 100 having been fixed to the duct 200 from the duct 200 and attaching the projector 100 to the duct 200 again in a different position. However, the procedure described above not only requires the additional attaching and detaching operation but also disrupts electric power supply to the projector 100 when the projector 100 is detached from the duct 200. In contrast, the slide mechanism 140B, which causes the power source accommodation section body 111 to slide, allows the positional adjustment without any influence on the electric power supply to the projector 100 but with the projector 100 keeping projecting an image. The user can therefore adjust the position of the projection section body 120 while looking at the projected image. Similarly, the coupler section 131, the coupler sections 122, 122, and the pivot mechanism 140A allow the projection direction to be adjusted in the three directions with the projector 100 keeping projecting an image.

In the projector 100 described above, the enclosure of the power source accommodation section body 111 corresponds to a first enclosure. The support mechanism 140 corresponds to a first mechanism. The enclosure of the projection section body 120 corresponds to a second enclosure. The angle adjustment mechanism formed of the coupler section 131 and the coupler sections 122, 122 corresponds to a second mechanism.

As described above, the projector 100 according to the second embodiment to which the invention is applied includes the power source accommodation section 110, which is attached to the duct 200; the projection section body 120, which has the projection section 125, which projects an image, and is supported by the power source accommodation section 110; and the support mechanism 140, which can change at least one of the direction and position of the projection section body 120 with respect to the duct 200. Since at least one of the direction and position of the projection section body 120 can be changed with respect to the power source accommodation section 110 as described above, the adjustment of the direction and position of the projection section body 120 can be made with the power source accommodation section 110 fixed to the duct 200. As a result, the projector 100 provided in accordance with the present embodiment can be securely attached to a ceiling surface or any other surface and allows the image projection direction to be readily adjusted over a wide range.

Further, the power source accommodation section 110 includes the power source accommodation section body 111, which has an enclosure having a longitudinally elongated shape, and the connector 115, which extends upward from the seating section 112 and is connected to the duct 200 having a watershoot-like shape, and the connector 115 is fixed to the duct 200 with the enclosure extending in the longitudinal direction of the duct 200. Therefore, the power source accommodation section 110 can be attached to the watershoot-shaped duct 200, and the position in which the projector 100 is attached and the angle at which the projector 100 is attached can be readily changed in the longitudinal direction of the duct 200. Further, since the enclosure of the power source accommodation section body 111 extends in the longitudinal direction of the duct 200, the power source accommodation section body 111 can be so attached that it does not greatly attract attention.

The projector 100 further includes the support member 130, which is coupled to the power source accommodation section 110 and the projection section body 120 and allows the power source accommodation section to support the projection section body 120, and the support member 130 is coupled to the power source accommodation section 110 via the coupler section 131 located directly below the connector 115. According to the configuration described above, since the load applied to the connector 115 is substantially limited to a load in the vertical direction, the burden on the connector 115 can be reduced, whereby the structure of the connector 115 can be simplified and the position in which the projector 100 is attached can be readily changed.

Further, the power source accommodation section 110 is mounted on the duct 200 installed along an installation surface, and the support mechanism 140 can adjust inclination of the projection section body 120 in a direction in which inclination of the installation surface is compensated. Therefore, when a ceiling surface, a wall surface, or any other surface is inclined, the resultant inclination of a projected image can be readily corrected.

Moreover, the projector 100 includes, in addition to the support mechanism 140, the angle adjustment mechanism formed of the coupler section 131 and the coupler sections 122, 122, which allow adjustment of the angle of the projection section body 120 with respect to the duct 200. The angle adjustment mechanism allows the projection section body 120 to pivot around at least one axis or in the example described above around two axes. On the other hand, the support mechanism 140 allows the projection section body 120 to pivot around an axis that is not parallel to the pivotal axes of the angle adjustment mechanism. As a result, the direction in which an image is projected can be freely adjusted.

Further, the power source accommodation section 110 accommodates the power source circuit 24, which energizes the projection section 125 based on electric power supplied from the duct 200. To change the projection direction in this configuration, the projection section body 120, which is lightweight because the power source circuit 24 is not accommodated therein but is separated therefrom, only needs to be moved. Further, the power source circuit 24 includes not only a transformer and a switching circuit but also a heat sink or any other similar component for appropriately dissipating heat from these components, as described above. The power source circuit 24, which is therefore a heavy component, does not need to be moved when the projection direction is changed because the power source circuit 24 is separate from the projection section body 120.

The coupler section 131 and the coupler sections 122, 122, which support the projection section body 120, only need to support and fix the projection section body 120 excluding the weight of the power source circuit 24. Since the burden on the coupler section 131 and the coupler sections 122, 122 is thus reduced and hence load capacity requirements are lowered, the coupler section 131 and the coupler sections 122, 122 can be designed with an increased degree of freedom. For example, a structure that allows the angle of the projection section 125 to be changed over a wide range and has other advantages can be employed. Further, since the power source accommodation section 110 is supported by the duct 200, no cable or any other component that allows the duct 200 to provide the power source accommodation section 110 with electric power need to be separately provided, whereby the structure can be simplified and the power source accommodation section 110 can be securely held. Therefore, the projector 100 provided in the present embodiment can be securely attached to a ceiling surface or any other surface and allows the image projection direction to be readily adjusted over a wide range.

Further, the projector 100 includes the power source accommodation section body 111, the support mechanism 140, the seating section 112, which is movably coupled to the power source accommodation section body 111 via the support mechanism 140, the connector 115, which is connected to the duct 200, the second mechanism, which is formed of the coupler sections 122 and 131, and the projection section body 120, which is movable coupled to the power source accommodation section body 111 via the second mechanism and positioned on the opposite side of the power source accommodation section body 111 to the connector 115. The projection section body 120 includes the projection section 125. The support mechanism 140 can adjust the orientation of the power source accommodation section body 111 with respect to the seating section 112 in the direction indicated by the arrow D around an imaginary first axis. The second mechanism can adjust the orientation of the projection section body 120 with respect to the power source accommodation section body 111 around a second axis (pivotal shaft 132) perpendicular to the first axis described above and a third axis (pivotal shafts 123) perpendicular to the second axis.

As a result, the orientation of the projection section body 120 can be adjusted around the two axes with the power source accommodation section 110 connected to the duct 200, and the orientation of the power source accommodation section body 111 can be adjusted around the first axis. The direction in which the projector 100 projects an image can therefore be adjusted with an increased degree of freedom. For example, even when a ceiling on which the duct 200 is provided is not parallel to the horizontal plane, the upper and lower edges of an image projected by the projector 100 can be readily so adjusted that the edges are parallel to the horizontal plane.

Each of the embodiments described above merely represents an aspect of the invention and can be arbitrarily changed and applied within the scope of the invention.

The above embodiments have been described with reference to the configuration in which the support member 130 is used as a support section that couples the power source accommodation section 110 and the projection section body 120 to each other and supports the projection section body 120. The invention is not necessarily configured this way. For example, a member coupled to the projection section body 120 only at a single location may be used. Specifically, joints that are paired with each other may be so provided that one of them extends upward from the upper surface of the projection section body 120 and the other extends downward from the bottom surface of the power source accommodation section 110, and the joints may be coupled to each other. More specifically, a ball joint or a universal joint may be used. Further, a support member formed of a plurality of articulate joints each of which is pivotal around a predetermined axis may be used. Moreover, each of the power source accommodation section 110 and the projection section body 120 does not necessarily have a box-like shape. For example, the projection section body 120 may have a spherical shape. Further, to enhance the heat dissipation effect provided by the support member 130, a plurality of heat dissipating fins may be formed on the surface of the support member 130.

The support mechanism 140 in the second embodiment described above is an aspect showing a specific configuration and does not necessarily have the configuration described above. For example, the configuration in which the flat-plate-shaped seating section 112 and the power source accommodation section body 111 are coupled to each other via the support mechanism 140 is not necessarily employed, and the power source accommodation section body 111 and other components may be coupled to the connector 115 via an adjustment mechanism.

Further, in the second embodiment described above, the support mechanism 140 allows fine adjustment of the projection section body 120 by moving the power source accommodation section body 111 relative to the duct 200. Instead, the power source accommodation section 110 may be fixed to the duct 200, and the projection section body 120 or the support member 130 may be moved relative to the power source accommodation section 110. Further, the following configurations may be employed: a configuration in which the power source accommodation section 110 is attached to the duct 200 independently of the projection section body 120 and the power source accommodation section 110 and the projection section body 120 are connected to each other via a cable; and a configuration in which the projection section body 120 accommodates the power source circuit 24. In this case, the projection section body 120 and the support member 130 can be attached to the duct 200 without using the power source accommodation section 110. When the configuration in which the power source accommodation section 110 is attached to the duct 200 independently of the projection section body 120 is employed, each of the projection section body 120 and the power source accommodation section 110 needs to be provided with the connector 115. In this case, however, the connector 115 on the power source accommodation section 110 needs to be capable of receiving electricity from the duct 200, but the connector 115 on the projection section body 120 does not need to receive electricity from the duct 200 and only needs to allow the duct 200 to support the projection section body 120. According to the configuration described above, the balance between the duct 200 and the projector 100 can be adjusted in terms of arrangement (weight) by appropriately selecting the position where the power source accommodation section 110 is attached.

Further, each functional block shown in FIG. 4 shows a functional configuration achieved by cooperation between hardware and software and is not necessarily implemented in a specific form. It is therefore not necessary to implement hardware corresponding to each functional block, and a single processor can, of course, execute a program to achieve functions of a plurality of functional portions. Further, in the embodiments described above, part of a function achieved by software may be achieved by hardware, or part of a function achieved by hardware may be achieved by software. In addition, a specific detailed configuration of each of the other portions of the projector 100 can be arbitrarily changed to the extent that the change does not depart from the substance of the invention.

What is claimed is:

1. A projector comprising:
a power source accommodation section that has a first connector to be connected to a power supply and accommodates a power source section that converts electric power supplied from the power supply; and
a projection section body that has a second connector to be in direct contact with the power supply and accommodates a projection section that projects an image, the projection section body being separate from the power source accommodation section and connected to the power source accommodation section.

2. The projector according to claim 1,
wherein the power source accommodation section receives the electric power from the power supply via the first connector, and
the projection section body does not receive the electric power from the power supply via the second connector.

3. The projector according to claim 1,
wherein the power source accommodation section has an enclosure having a longitudinally elongated shape, and
the first connector has a watershoot-like shape and is capable of being fixed to the power supply with the enclosure extending in a longitudinal direction of the power supply.

4. The projector according to claim 1,
wherein the projection section includes a light source.

5. The projector according to claim 1,
wherein the power source accommodation section accommodates a light source and includes a light guide section that guides light emitted from the light source to the projection section body.

6. The projector according to claim 1,
further comprising a support mechanism capable of changing at least one of a direction and a position of the projection section body with respect to the power supply.

7. A projector comprising:
a power source accommodation section that has a first connector to be connected to a power supply and accommodates a power source section that converts electric power supplied from the power supply; and
a projection section body that has a second connector to be connected to the power supply independently of the connection of the power source accommodation section to the power supply, and accommodates a projection section that projects an image, the projection section body being separate from the power source accommodation section and connected to the power source accommodation section.

* * * * *